United States Patent
Chen et al.

(10) Patent No.: US 8,190,343 B2
(45) Date of Patent: May 29, 2012

(54) GEAR ACTUATOR CONTROL SYSTEMS AND METHODS FOR DUAL CLUTCH TRANSMISSIONS

(75) Inventors: Yue-Ming Chen, Canton, MI (US); Vijay A. Neelakantan, Rochester Hills, MI (US)

(73) Assignee: GM Global Technology Operations LLC

( * ) Notice: Subject to any disclaimer, the term of this patent is extended or adjusted under 35 U.S.C. 154(b) by 419 days.

(21) Appl. No.: 12/579,759

(22) Filed: Oct. 15, 2009

(65) Prior Publication Data

US 2011/0093172 A1    Apr. 21, 2011

(51) Int. Cl.
G06F 19/00 (2006.01)
F16D 13/72 (2006.01)

(52) U.S. Cl. ............... 701/67; 701/68; 477/86; 477/70; 477/181; 74/340; 74/335

(58) Field of Classification Search ............ 701/67, 701/68, 51, 62, 63; 477/86, 174, 175, 70, 477/906, 181; 74/340, 335, 330, 331
See application file for complete search history.

(56) References Cited

U.S. PATENT DOCUMENTS

| | | | |
|---|---|---|---|
| 6,286,381 B1 * | 9/2001 | Reed et al. | 74/336 R |
| 6,364,809 B1 * | 4/2002 | Cherry | 477/86 |
| 6,591,705 B1 * | 7/2003 | Reik et al. | 74/343 |
| 6,790,159 B1 * | 9/2004 | Buchanan et al. | 477/86 |
| 6,819,997 B2 * | 11/2004 | Buchanan et al. | 701/67 |
| 6,883,394 B2 * | 4/2005 | Koenig et al. | 74/335 |
| 6,953,417 B2 * | 10/2005 | Koenig | 477/181 |
| 7,384,374 B2 * | 6/2008 | Jiang | 477/120 |
| 2004/0069082 A1 * | 4/2004 | Koenig et al. | 74/335 |
| 2004/0166992 A1 * | 8/2004 | Buchanan et al. | 477/181 |
| 2005/0107214 A1 * | 5/2005 | Koenig | 477/174 |
| 2007/0056399 A1 * | 3/2007 | Barnes et al. | 74/335 |
| 2007/0142171 A1 * | 6/2007 | Jiang | 477/115 |
| 2007/0208480 A1 * | 9/2007 | Disch-Simon et al. | 701/59 |
| 2009/0241728 A1 * | 10/2009 | Fitzgerald et al. | 74/665 A |
| 2010/0192718 A1 * | 8/2010 | Baldwin | 74/473.12 |
| 2010/0243402 A1 * | 9/2010 | Momal | 192/85.63 |
| 2011/0030493 A1 * | 2/2011 | Koenig et al. | 74/473.11 |

* cited by examiner

Primary Examiner — Ronnie Mancho

(57) ABSTRACT

A control system for a dual clutch transmission (DCT) of a vehicle comprises a difference module, a summer module, and a position control module. The difference module determines a difference between a desired position for a gear actuator and a measurement of a current position of the gear actuator. The summer module determines a sum of a derivative of the difference and a product of the difference and a predetermined gain. The position control module controls the current position of the gear actuator based on the sum. The current position of the gear actuator controls a position of a gear synchronizer that slides along an output shaft of the DCT. The position of the gear synchronizer controls coupling of a gear ratio with the output shaft.

18 Claims, 8 Drawing Sheets

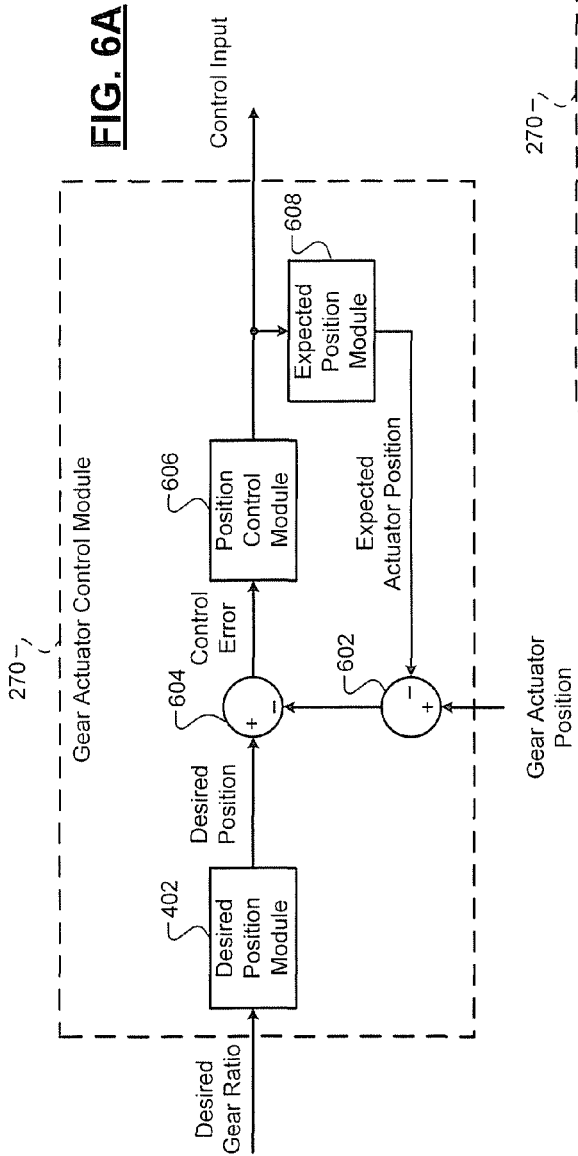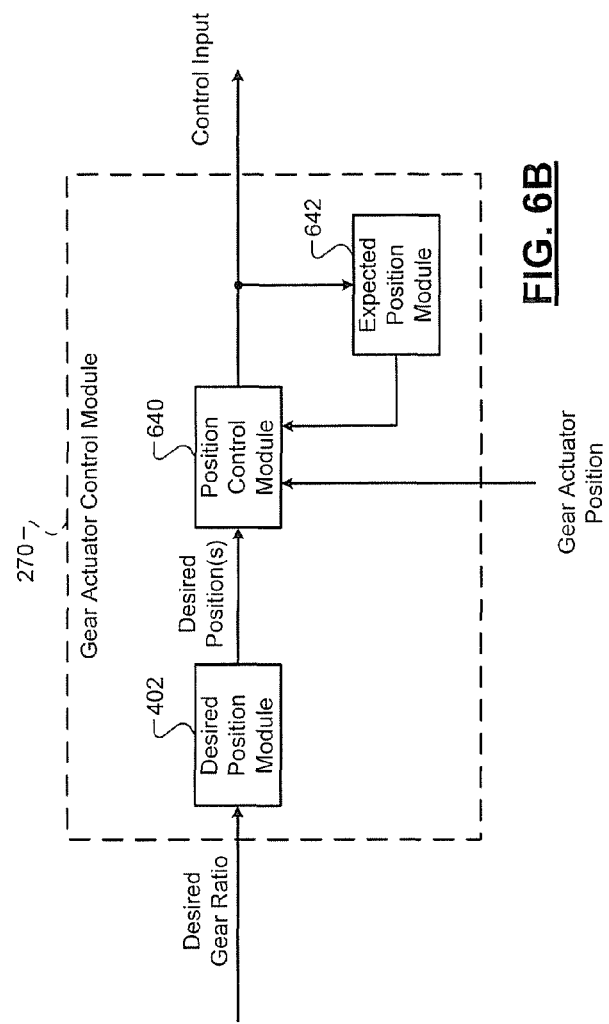

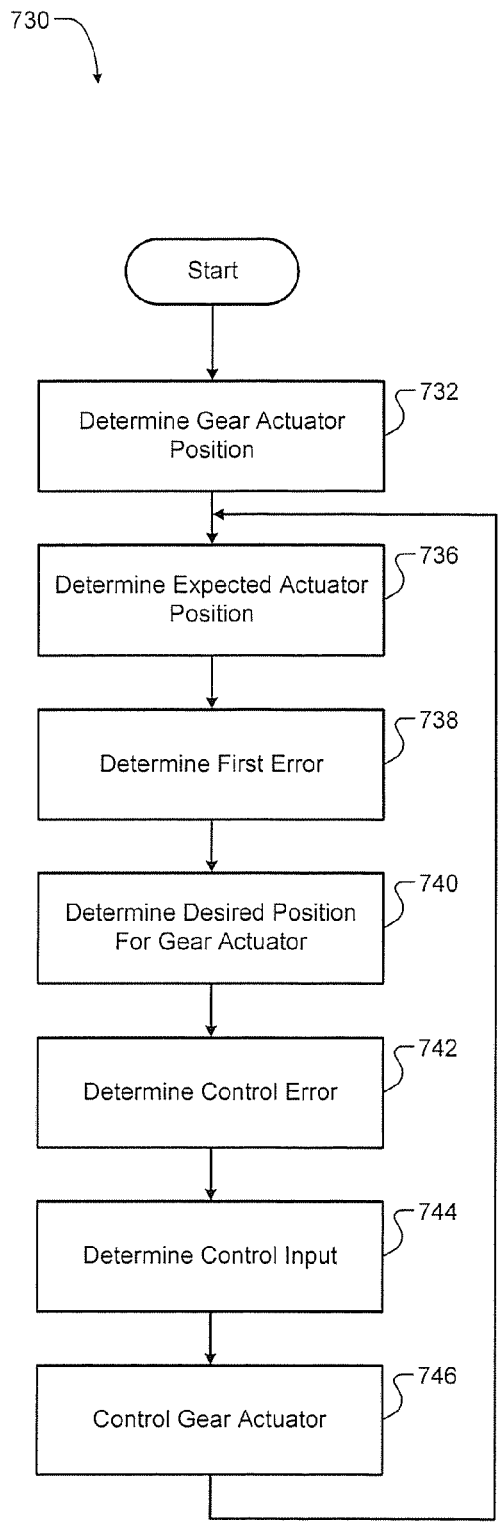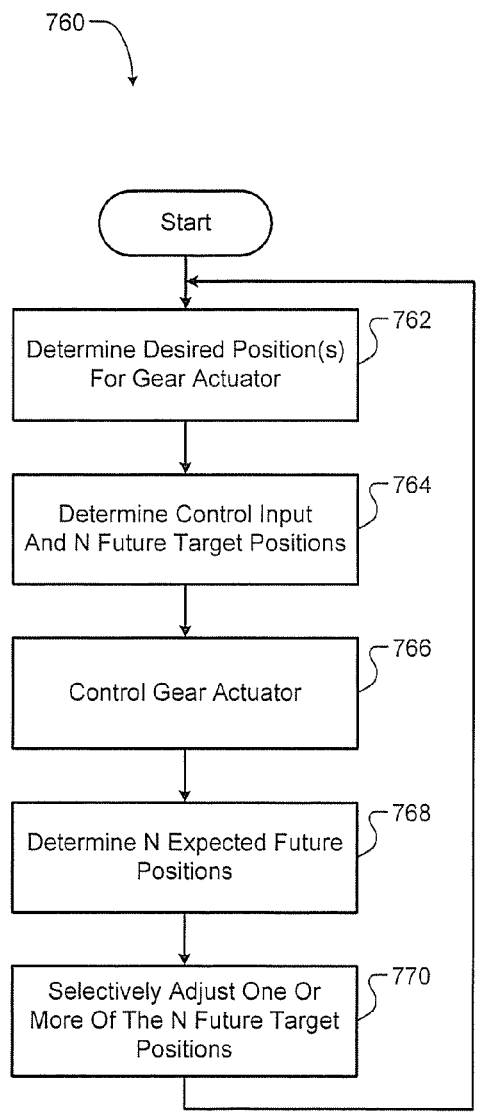
FIG. 7B
FIG. 7C

GEAR ACTUATOR CONTROL SYSTEMS AND METHODS FOR DUAL CLUTCH TRANSMISSIONS

FIELD

The present disclosure relates to internal combustion engines and more particularly to transmission control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to produce drive torque. One or more electric motors may additionally or alternatively produce drive torque. Drive torque is provided to a transmission, and the transmission transfers torque to one or more wheels to propel the vehicle. In some vehicles, the transmission includes a dual clutch transmission (DCT).

A DCT includes two clutches: each clutch is associated with one independent input shaft. An odd gearset is coupled to one of the two input shafts and an even gearset is coupled to the other of the two input shafts. At a given time, one of the two clutches receives drive torque while the other of the two clutches does not. In this manner, drive torque is transferred to one of the two input shafts and gearsets at the given time.

Gear synchronizers move along a shaft of the DCT to mechanically couple the gear ratios to the shaft. Gear actuators control the positions and engagement of the synchronizers. As torque is transferred to one of the two input shafts and gearsets at the given time, an oncoming gear ratio associated with the other of the two input shafts and gearsets may be mechanically coupled to the shaft and pre-selected in anticipation of shifting to the oncoming gear ratio. Shifting to the oncoming gear ratio may be accomplished in a short period by shifting which one of the two clutches receives drive torque.

SUMMARY

A control system for a dual clutch transmission (DCT) of a vehicle comprises a difference module, a summer module, and a position control module. The difference module determines a difference between a desired position for a gear actuator and a measurement of a current position of the gear actuator. The summer module determines a sum of a derivative of the difference and a product of the difference and a predetermined gain. The position control module controls the current position of the gear actuator based on the sum. The current position of the gear actuator controls a position of a gear synchronizer that slides along an output shaft of the DCT. The position of the gear synchronizer controls coupling of a gear ratio with the output shaft.

In other features, a control system for a dual clutch transmission (DCT) of a vehicle comprises a first difference module, a second difference module, and a position control module. The first difference module determines a first difference between a measurement of a current position of a gear actuator and an expected position of the gear actuator after actuation based on a control input. The second difference module determines a second difference between a desired position for the gear actuator and the first difference. The position control module updates the control input based on the second difference and controls the current position based on the control input. The current position of the gear actuator controls a position of a gear synchronizer that slides along an output shaft of the DCT. The position of the gear synchronizer controls coupling of a gear ratio with the output shaft.

In still other features, a control system for a dual clutch transmission (DCT) of a vehicle comprises a desired position module, a position control module, and an expected position module. The desired position module determines at least one desired position for a gear actuator. The position control module determines a control input for the gear actuator, controls a current position of the gear actuator based on the control input, and determines N future target positions for the gear actuator for N future control loops, respectively, wherein N is an integer greater than one. The expected position module determines N expected future positions based on the N future target positions, respectively. The position control module selectively adjusts one or more of the N future target positions based on one or more of the N expected future positions. The position control module controls the current position during an M-th one of the N future control loops based on the M-th one of the N future target positions, wherein M is an integer and is one of less than and equal to N.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6A-6B are functional block diagrams of other exemplary implementations of gear actuator modules; and FIGS. 7A-7C are flowcharts depicting exemplary steps performed by methods.

DETAILED DESCRIPTION

Figure 1:
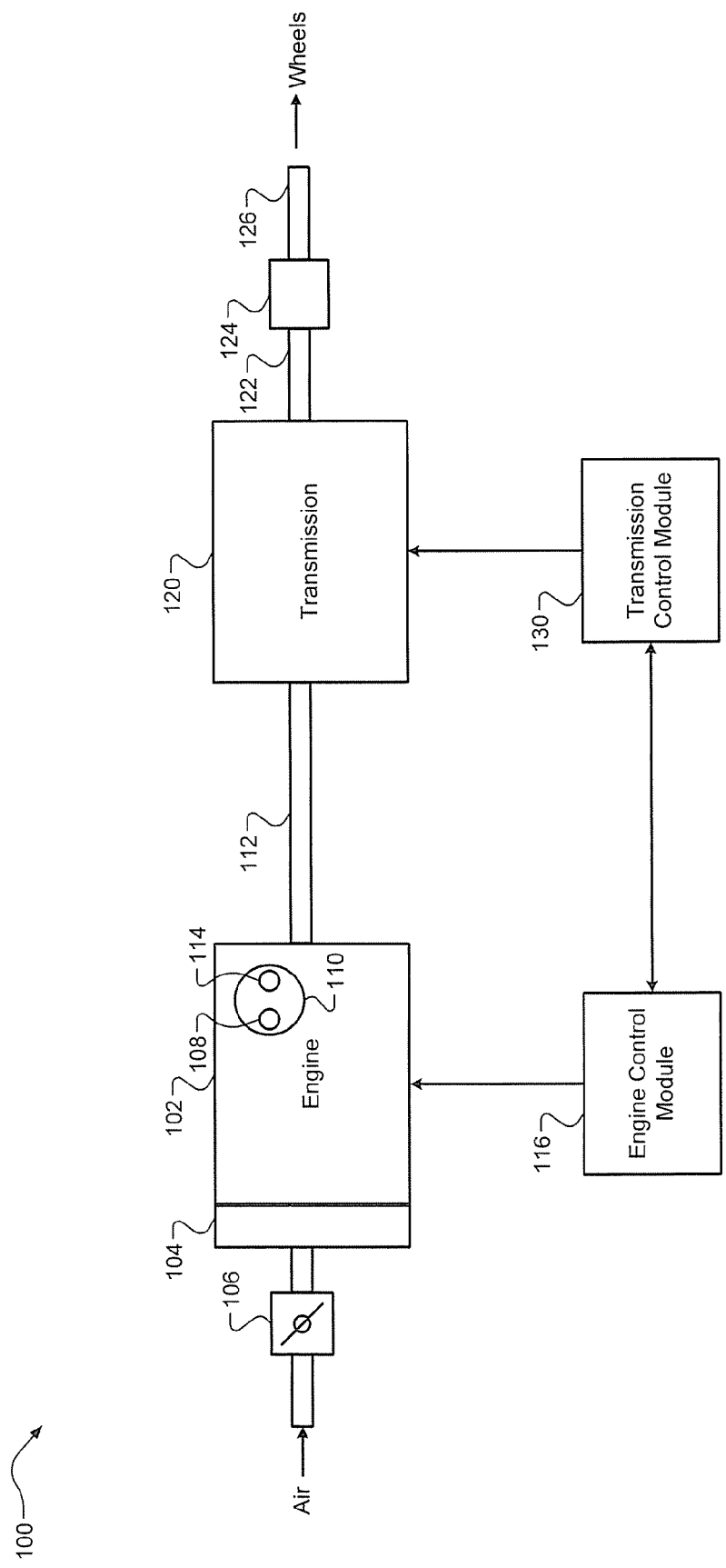
FIG. 1 is a functional block diagram an exemplary power train system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A transmission control module (TCM) determines a desired position for a gear actuator in a dual clutch transmission (DCT) based on a desired gear ratio. The gear actuator controls a position of a gear synchronizer that slides along an output shaft of the DCT to couple the desired gear ratio with the output shaft of the DCT.

Part-to-part differences between gear actuators and/or gear synchronizers may cause the gear actuator to arrive at the desired position slowly or may prevent the gear actuator from reaching the desired position. Cold ambient temperatures may cause a change in viscosity of a hydraulic fluid applied to the gear actuator. This viscosity change may similarly cause the gear actuator to arrive at the desired position more slowly or prevent the gear actuator from reaching the desired position.

In some implementations, the TCM of the present disclosure determines a difference between the desired position and a measurement of the gear actuator position. The TCM determines a sum of a derivative of the difference and a product of the difference and a predetermined gain. The TCM determines a control input based on the sum and controls the position of the gear actuator based on the control input. Controlling the position of the gear actuator based on the control input ensures that the gear actuator will arrive at the desired position as rapidly as possible despite any part-to-part differences and/or changes in the viscosity of the hydraulic fluid.

Referring now to FIG. 1, a functional block diagram of an exemplary power train system 100 of a vehicle is presented. The vehicle includes an engine 102 that generates drive torque for the vehicle. One or more electrical motors (or motor-generators) may additionally or alternatively generate drive torque. While the engine 102 will be discussed as a gasoline type internal combustion engine (ICE), the engine 102 may include another suitable type of engine, such as a diesel type ICE, an electric type engine, or a hybrid type engine.

Air is drawn into the engine 102 through an intake manifold 104. The volume of air drawn into the engine 102 may be varied using a throttle valve 106. One or more fuel injectors 108 mix fuel with the air to form a combustible air/fuel mixture. The air/fuel mixture is combusted within cylinders of the engine 102, such as cylinder 110. Although the engine 102 is depicted as including one cylinder, the engine 102 may include more or fewer cylinders.

The cylinder 110 includes a piston (not shown) that is mechanically linked to a crankshaft 112. One combustion event within the cylinder 110 may be described in four phases: an intake phase, a compression phase, a combustion (or expansion) phase, and an exhaust phase. During the intake phase, the piston moves toward a bottommost position within the cylinder 110. During the compression phase, the piston moves toward a topmost position and compresses the air or air/fuel mixture within the cylinder 110.

The combustion phase begins when, for example, spark from a spark plug 114 ignites the air/fuel mixture. The combustion of the air/fuel mixture drives the piston, and the piston rotatably drives the crankshaft 112. Resulting exhaust gas is expelled from the cylinder 110 to complete the exhaust phase and the combustion event. An engine control module (ECM) 116 controls the torque output of the engine 102.

The engine 102 outputs torque to a transmission 120 via the crankshaft 112. The transmission 120 receives torque output by the engine 102 and selectively transfers torque to one or more wheels of the vehicle (not shown). More specifically, torque input to the transmission 120 is selectively transmitted to a transmission output shaft 122 based on a gear ratio engaged within the transmission 120. The transmission output shaft 122 transfers torque to a differential 124 that transfers torque to one or more wheels of the vehicle via a driveline 126.

Figure 2:
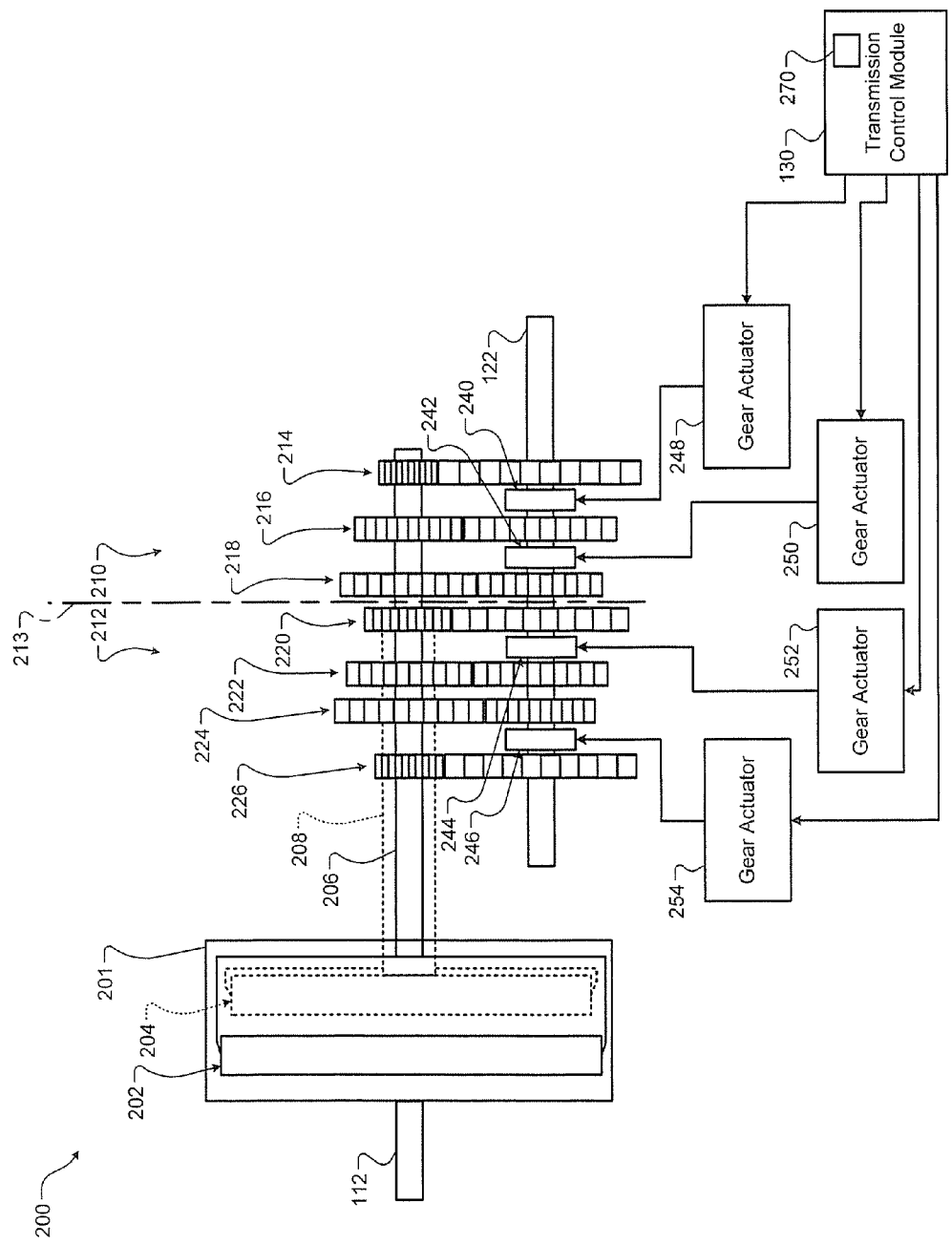
FIG. 2 is a diagram of an exemplary implementation of a dual clutch transmission (DCT) system.

The transmission 120 includes a dual clutch transmission (DCT) (FIG. 2). A gear ratio (or drive ratio) may be defined as the ratio of an input speed of the DCT 120 to an output speed of the DCT 120. The input speed of the DCT 120 may be measured using one or more sensors (not shown). In some implementations the input speed may be based on the output speed of the engine 102 (i.e., the rotational speed of the crankshaft 112 or a flywheel) or another suitable measure of the input speed. The output speed of the DCT 120 may be measured using one or more sensors based on rotation of the transmission output shaft 122.

A transmission control module (TCM) 130 controls the gear ratio by controlling which clutch, input shaft, and gearset receive drive torque and which gearset is coupled to the transmission output shaft 122 of the DCT 120. The TCM 130 may control the gear ratio based on various shift maps, measured parameters (e.g., throttle opening and vehicle speed), and/or inputs from a driver (e.g., upshifts and downshifts). The ECM 116 and the TCM 130 may communicate with one another via a car area network (CAN), for example, to coordinate shifts within the DCT 120.

Referring now to FIG. 2, an exemplary diagram of a DCT system 200 is presented. The DCT 120 includes a clutch pack 201 that includes two clutches: a first clutch 202 and a second clutch 204. The first clutch 202 is linked to a first input shaft 206, and the second clutch 204 is linked to a second input shaft 208. The first and second input shafts 206 and 208 may be implemented in a nested orientation. More specifically, one of the first and second input shafts 206 and 208 may be located within the other of the first and second input shafts 206 and 208. For example only, the first input shaft 206 may be located within the second input shaft 208 as shown in FIG. 2.

Generally, one of the first and second clutches 202 and 204 receives drive torque at a given time. When the first clutch 202 receives drive torque, torque is transferred to an odd gearset 210 via the first input shaft 206. Torque is transferred to an even gearset 212 via the second input shaft 208 when the second clutch 204 receives drive torque. Dashed line 213 is shown for purposes of illustration only, to illustrate the separation of the odd and even gearsets 210 and 212. For example only, the odd gearset 210 may be located to the right of the dashed line 213 and the even gearset 212 may be located to the left of the dashed line 213.

The odd gearset 210 is linked to and rotates with the first input shaft 206. The even gearset 212 is linked to and rotates with the second input shaft 208. The odd gearset 210 includes pairs of input gears and output gears (each pair referred to as a gearset) that provide odd numbered gear ratios. For example only, the odd gearset 210 may include gearsets 214, 216, and 218 when the DCT 120 is capable of providing six gear ratios (i.e., is a six speed transmission). The gearsets 214, 216, and 218 correspond to a first gear ratio, a third gear ratio, and a fifth gear ratio, respectively.

The even gearset 212 includes pairs of input gears and output gears (each pair referred to as a gearset) that provide even numbered gear ratios. For example only, the even gearset 212 may include gearsets 220, 222, and 224 when the DCT 120 is capable of providing six gear ratios. The gearsets 220, 222, and 224 correspond to a second gear ratio, a fourth gear ratio, and a sixth gear ratio, respectively. A reverse gearset 226 may also be provided with the even gearset 212. The numerical label attributed to a given gear ratio (e.g., first-sixth) may increase as the gear ratio increases.

The gearsets 214-226 each include an input gear and an output gear. The input gears of the gearsets 214-218 are coupled to and rotate with the first input shaft 206. The input gears of the gearsets 220-226 are coupled to and rotate with the second input shaft 208. The input and output gears of a given gearset of the gearsets 214-226 are meshed, and rotation of the one of the input and output gears of the given gearset causes rotation of the other of the input and output gears of the given gearset. In this manner, the input gear and the output gear of the given gearset provide the gear ratio of the given gearset when the given gearset is engaged.

The first and second clutches 202 and 204 control whether torque is transferred to the odd gearset 210 or to the even gearset 212, respectively. Synchronizers 240, 242, 244, and 246 slide along the transmission output shaft 122 and mechanically couple the output gears of the gearsets 214-224 to the transmission output shaft 122. Gear actuators 248, 250, 252, and 254 are associated with the synchronizers 240, 242, 244, and 246, respectively. The gear actuators 248-254 control the positions of the synchronizers 240-246 (i.e., movement of the synchronizers 240-246), respectively, based on signals from the TCM 130.

The DCT 120 allows the current gear ratio to be engaged within the DCT 120 while an oncoming gear ratio may be selected and coupled to the transmission output shaft 122 in anticipation of a gear shift to the oncoming gear ratio. The gear ratio may be shifted to the oncoming gear ratio by shifting which one of the first and second clutches 202 and 204 receives drive torque. In this manner, the DCT 120 allows for rapid gear shifts.

The TCM 130 controls the first and second clutches 202 and 204 and the positions of the synchronizers 240-246 to control the gear ratio. The TCM 130 includes a gear actuator module 270 that controls one or more of the gear actuators 248-254.

Figure 3:
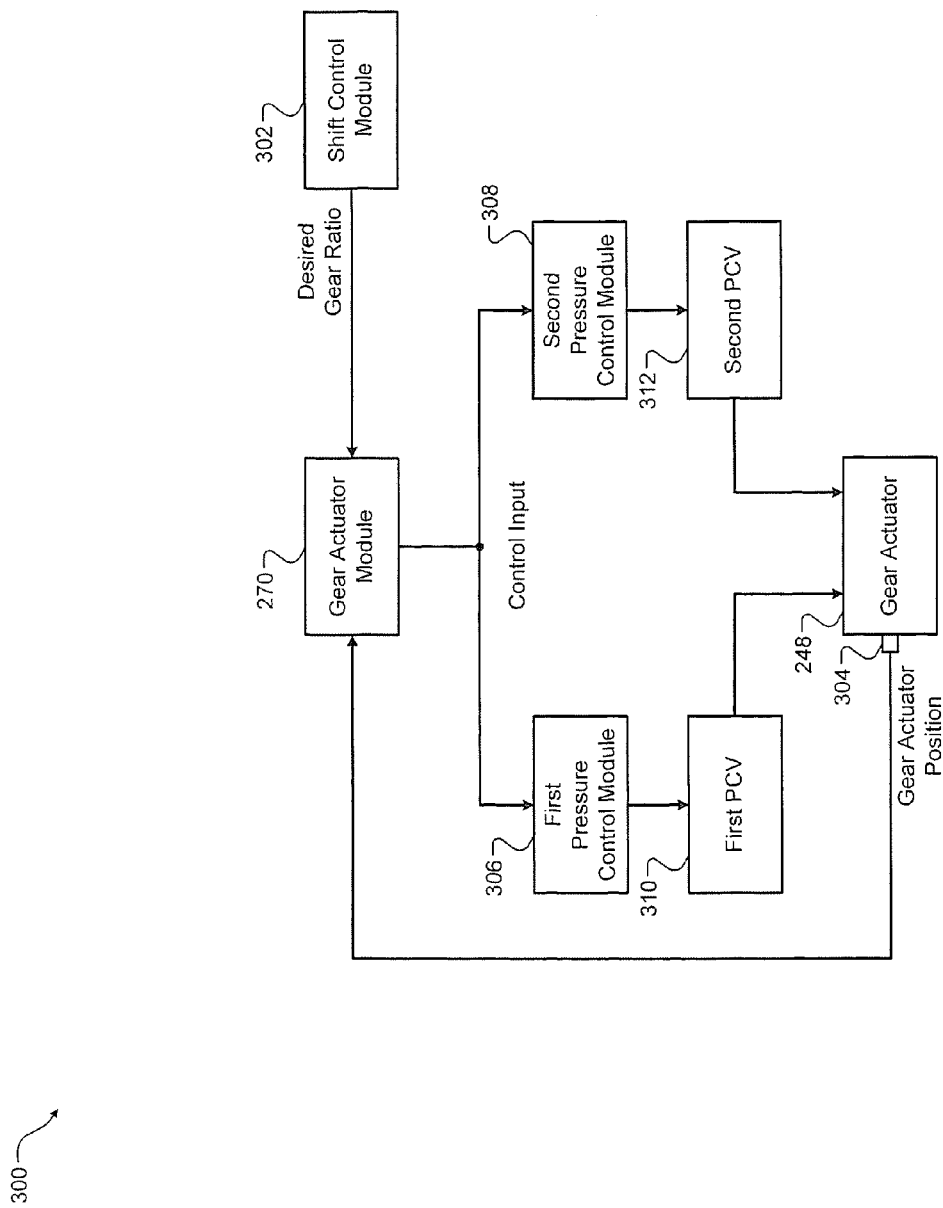
FIG. 3 is a functional block diagram of an exemplary gear actuator control system.

Referring now to FIG. 3, a functional block diagram of an exemplary gear actuator control system 300 is presented. A shift control module 302 determines a desired gear ratio and provides the desired gear ratio to the gear actuator module 270. For example only, the shift control module 302 may determine the desired gear ratio based on opening of the throttle valve 106, vehicle speed, one or more shift maps, and/or other suitable parameters. The shift control module 302 may also determine the desired gear ratio based on driver inputs, such as tapshifts requesting upshifts or downshifts in the gear ratio. In some implementations, the gear actuator module 270, the shift control module 302, and one or more other modules may be implemented within the TCM 130.

The gear actuator module 270 determines a desired position for the gear actuator 248. While the gear actuator module 270 will be discussed as it relates to controlling the gear actuator 248, the gear actuator module 270 or another module may control the other gear actuators 250-254 similarly or identically.

A gear actuator position sensor 304 is associated with the gear actuator 248. The gear actuator position sensor 304 measures the position of the gear actuator 248 and generates a gear actuator position signal accordingly. In some implementations, the gear actuator position sensor 304 may include a Hall-effect sensor. One or more additional gear actuator position sensors may also be included within the DCT 120. For example only, one or more gear actuator position sensors may be provided for each of the gear actuators 248-254.

The gear actuator module 270 uses the gear actuator position measured by the gear actuator position sensor 304 and the desired position in controlling the position of the gear actuator 248. The gear actuator module 270 determines a control input based on the gear actuator position measured by the gear actuator position sensor 304 and the desired position.

The gear actuator 248 includes two chambers for hydraulic fluid (not shown). The position of the gear actuator 248 and, therefore, the position of the synchronizer 240, is controlled based on the pressures of the chambers. The gear actuator module 270 provides the control input to a first pressure control module 306 and a second pressure control module 308. The first pressure control module 306 controls the pressure within one of the two chambers of the gear actuator 248 based on the control input. The second pressure control module 308 controls the pressure within the other of the two chambers of the gear actuator 248 based on the control input.

More specifically, the first pressure control module 306 controls a first pressure control valve (PCV) 310 based on the control input. The second pressure control module 308 controls a second PCV 312 based on the control input. For example only, the first and second pressure control modules 306 and 308 may control voltage, current, and/or pulse width modulation (PWM) applied to the first and second PCVs 310 and 312, respectively. The first and second pressure control modules 306 and 308 control the pressure of the hydraulic fluid applied to the chambers of the gear actuator 248 via the first and second PCVs 310 and 312, respectively. In this manner, the gear actuator module 270 controls the position of the gear actuator 248 and, accordingly, the position of the synchronizer 240, based on the control input.

Figure 4:
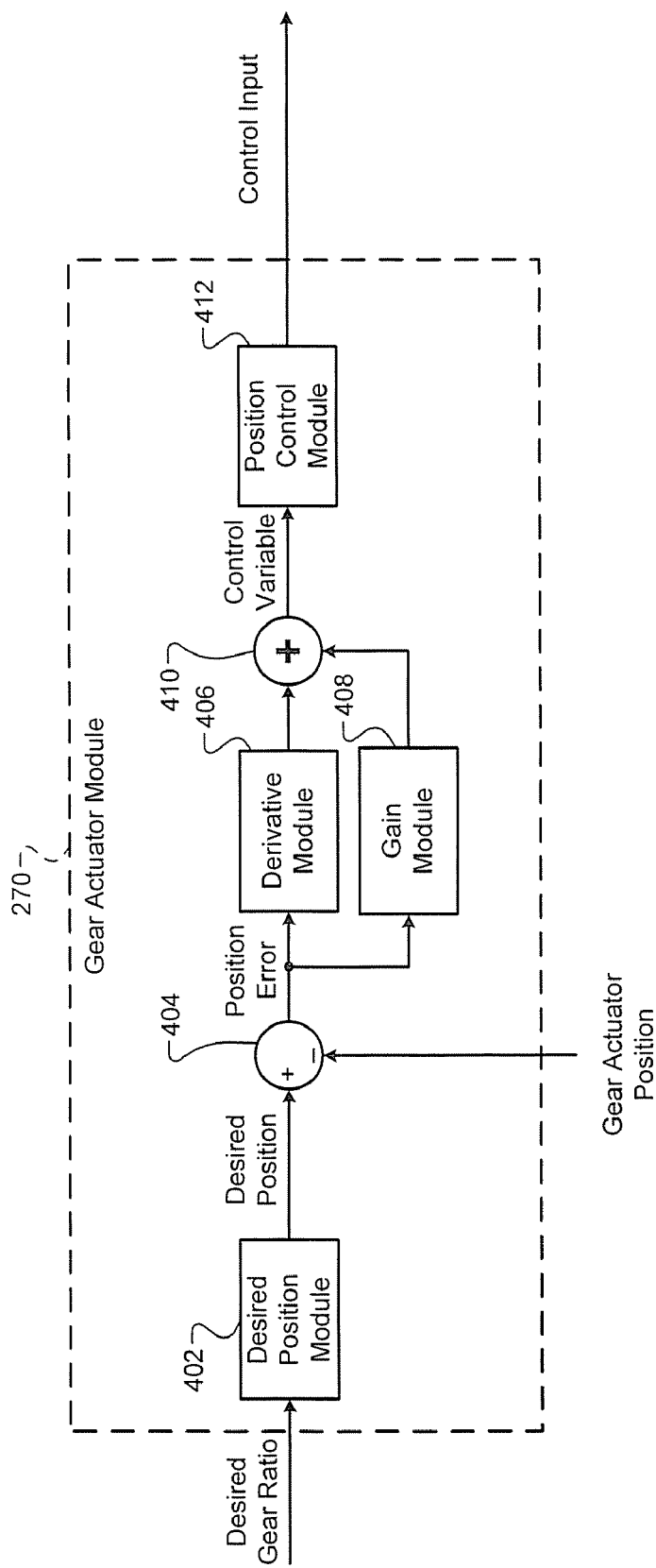
FIG. 4 is a functional block diagram of an exemplary implementation of a gear actuator module.

Referring now to FIG. 4, a functional block diagram of an exemplary implementation of the gear actuator module 270 is presented. The gear actuator module 270 may include a desired position module 402, a difference module 404, and a derivative module 406. The gear actuator module 270 may also include a gain module 408, a summer module 410, and a position control module 412.

The desired position module 402 determines a desired position for the gear actuator 248 based on the desired gear ratio. The difference module 404 determines a position error based on a difference between the desired position provided by the desired position module 402 and the gear actuator position measured by the gear actuator position sensor 304. For example only, the difference module 404 may determine the position error as the desired position less the gear actuator position. The difference module 404 provides the position error to the derivative module 406 and the gain module 408.

The derivative module 406 determines a mathematical derivative of the position error. For example only, the derivative module 406 may determine a first-derivative of the position error. The gain module 408 applies a predetermined gain to the position error. More specifically, the gain module 408 multiplies the position error by the predetermined gain. The predetermined gain may be calibratable and may be set based on a gain applied to the position error during a satisfactory actuation of the gear actuator 248 and/or the synchronizer 240. For example only, the predetermined gain may be approximately 80.0.

The summer module 410 determines a control variable for the gear actuator 248 based on the derivative of the position error and the product of the position error and the predetermined gain. More specifically, the summer module 410 determines the control variable based on a sum of the derivative of the position error and the product. For example only, the summer module 410 may determine the control variable using the following equation.

$$\text{Control Variable} = \dot{e} + \lambda * e, \quad (1)$$

where e is the position error, ė is the time derivative of the position error, and λ is the predetermined gain. The predetermined gain may correspond to a desired eigenvalue of the response. The control variable may also be referred to as a sliding mode variable. The position control module 412 determines the control input based on the control variable. FIGS. 5A-5D are functional block diagrams of exemplary implementations of the position control module 412.

Figure 5B:
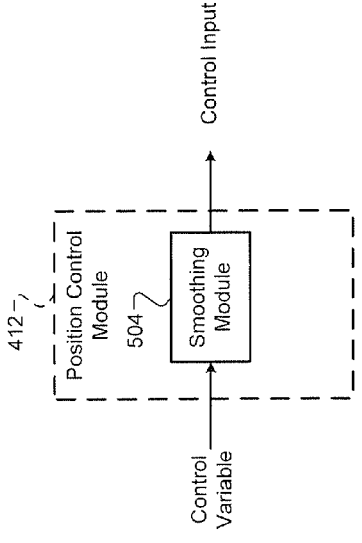
FIGS. 5A-5D are functional block diagrams of exemplary implementations of position control modules.
Figure 5D:
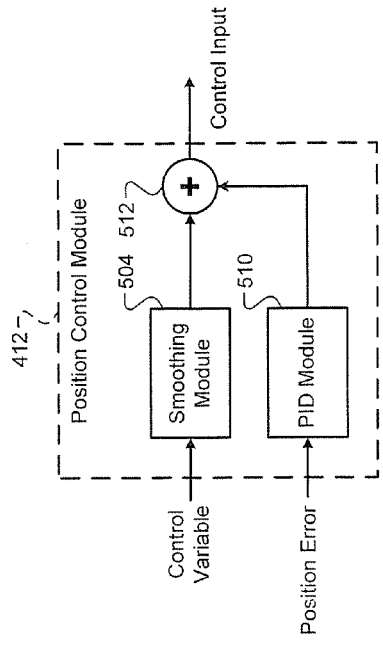
Figure 5A:
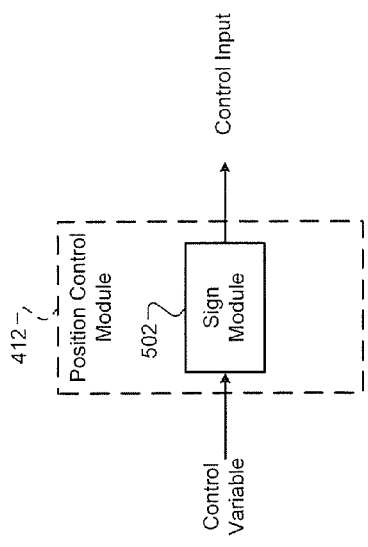

Referring now to FIG. 5A, a functional block diagram of an exemplary implementation of the position control module 412 is presented. In some implementations, the position control module 412 may include a sign module 502. The sign module 502 receives the control variable from the summer module 410 and determines the control input.

The sign module 502 may determine the control input based on the control variable and a predetermined value. For example only, the sign module 502 may determine the control input using the following equation.

$$\text{Control Input} = M * \text{sign}(\text{Control Variable}), \quad (2)$$

where M is the predetermined value and sign(Control Variable) is the result of a sign function performed using the control variable. The result of the sign function of the control variable is equal to 1.0 when the control variable is positive (i.e., >0.0) and is equal to −1.0 when the control variable is negative (i.e., <0.0). The predetermined value (M) may be calibratable based on the system and may be set to, for example, approximately 0.02.

Referring now to FIG. 5B, a functional block diagram of another exemplary implementation of the position control module 412 is presented. The position control module 412 may include a smoothing module 504. The smoothing module 504 receives the control variable from the summer module 410 and determines the control input.

The smoothing module 504 determines the control input based on the control variable, the predetermined value, and a second predetermined value. For example only, the smoothing module 504 may determine the control input using the following equation.

$$\text{Control Input} = M * f(k * (\text{Control Variable})), \quad (3)$$

where M is the predetermined value, k is the second predetermined value, and f(k*(Control Variable)) is a result of a function performed using the product of the second predetermined value and the control variable. For example only, the function may include a hyperbolic tangent function or a saturation function ($-1.0 \leq f(k*(\text{Control Variable})) \leq 1.0$). The second predetermined value may be calibratable and may be set to, for example, approximately 50.0.

Figure 5C:
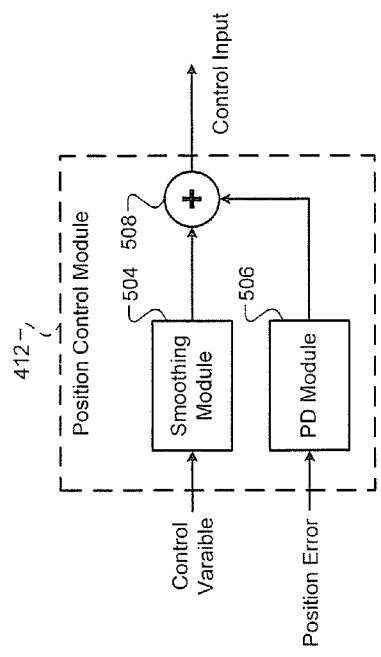

Referring now to FIG. 5C, a functional block diagram of another exemplary implementation of the position control module 412 is presented. The position control module 412 of FIG. 5C includes the smoothing module 504, a proportional-derivative (PD) module 506, and a summer module 508. The smoothing module 504 determines an output value using equation (3) described above.

The PD module 506 receives the position error from the difference module 404 and applies a proportional-derivative control scheme to the position error. The PD module 506 outputs a PD value based on a result of the application of the PD control scheme to the position error. The summer module 508 determines the control input based on the output value from the smoothing module 504 and the PD value from the PD module 506. More specifically, the summer module 508 determines the control input as a sum of the output value and the PD value.

Referring now to FIG. 5D, a functional block diagram of another exemplary implementation of the position control module 412 is presented. The position control module 412 of FIG. 5D includes the smoothing module 504, a proportional-integral-derivative (PID) module 510, and a summer module 512. The smoothing module 504 determines the output value similarly or identically to the smoothing module 504 of FIG. 5B and FIG. 5C.

The PID module 510 receives the position error from the difference module 404 and applies a PID control scheme to the position error. The PID module 510 outputs a PID value based on a result of the application of the PID control scheme to the position error. The summer module 512 determines the control input based on the output value from the smoothing module 504 and the PID value from the PID module 510. More specifically, the summer module 512 determines the control input based on a sum of the output value and the PID value.

Referring now to FIG. 6A, a functional block diagram of another exemplary implementation of the gear actuator module 270 is presented. The gear actuator module 270 of FIG. 6A includes the desired position module 402, a first difference module 602, and a second difference module 604. The gear actuator module 270 also includes a position control module 606 and an expected position module 608.

The first difference module 602 determines a first error based on the gear actuator position measured by the gear actuator position sensor 304 and an expected actuator position provided by the expected position module 608. For example only, the first difference module 602 may determine the first error as the gear actuator position less the expected actuator position.

The second difference module 604 determines a control error based on the first error provided by the first difference module 602 and the desired position provided by the desired position module 402. For example only, the second difference module 604 may determine the control error as the desired position less the first error.

The position control module 606 determines the control input based on the control error. For example only, the position control module 606 may determine the control input using the following equation for a second order system.

$$\text{Control Input} = \frac{s^2 + 2*\xi*\omega_n*s + \omega_n^2}{K*(\lambda*s+1)^2} * (CE), \quad (4)$$

where CE is the control error, s is the Laplace Transform variable, ξ is a third predetermined value, $\omega_n$ is a fourth predetermined value, K is a fifth predetermined value, and λ is a sixth predetermined value. The third, fourth, fifth, and sixth predetermined values may be calibratable and may be set to, for example, approximately 0.1, approximately 10.0, approximately 100.0, and approximately 0.25, respectively.

The expected position module 608 expects that the gear actuator 248 and the associated devices may act like a second-order system. The expected position module 608 may also expect that the gear actuator position that will be measured by the gear actuator position sensor 304 after actuation based on the control input. The system model for the gear actuator position may be represented by the following equation.

$$\text{Gear Actuator Position} = \frac{K_S}{s^2 + 2*\xi_s*\omega_{ns}*s + \omega_{ns}^2} * (CI), \quad (5)$$

where CI is the control input, s is the Laplace Transform variable, $K_s$ is a seventh predetermined value, $\xi_s$ is eighth predetermined value, and $\omega_{ns}$ is a ninth predetermined value. The seventh, eighth, and ninth predetermined values may be calibratable and may be set to, for example, approximately 101.0, approximately 0.18, and approximately 9.1, respectively.

Based on the expected response of the gear actuator 248 and the associated devices, the expected position module 608 determines the expected actuator position based on the control input. For example only, the expected position module 608 may determine the expected actuator position using the following equation.

$$\text{Expected Actuator Position} = \frac{K}{s^2 + 2*\xi*\omega_n*s + \omega_n^2} * (CI), \quad (6)$$

where $\xi$ is the third predetermined value, $\omega_n$ is the fourth predetermined value, and K is the fifth predetermined value. Differences between predetermined values bearing similar subscripts (e.g., the fifth and seventh predetermined values) may be attributable to system uncertainties.

Referring now to FIG. 6B, a functional block diagram of another exemplary implementation of the gear actuator module 270 is presented. The gear actuator module 270 of FIG. 6B includes the desired position module 402, a position control module 640, and an expected position module 642. The desired position module 402 determines the desired position for the gear actuator 248 based on the desired gear ratio. The desired position module 402 may also determine one or more future desired positions for the gear actuator 248.

The position control module 640 determines the control input. The position control module 640 also determines N future target positions for the gear actuator 248 during N future control loops, where N is an integer greater than one (1.0). The position control module 640 outputs the control input and selectively adjusts one or more of the N future target positions based on the resulting gear actuator position measured by the gear actuator position sensor 304. In this manner, the position control module 640 selectively uses feedback from the gear actuator position sensor 304 to adjust one or more of the N future target positions.

The position control module 640 determines the control input and the N future target positions based on the desired position(s). The position control module 640 determines the control input and the N future target positions further based on constraints (e.g., voltage and current). The position control module 640 also determines the control input and/or the N future target positions based on N expected future positions.

The expected position module 642 determines the N expected future positions based on the N future target positions. The N expected future positions correspond to positions of the gear actuator 248 that are expected to result from controlling the gear actuator 248 based on the N future target positions, respectively. For example only, the expected position module 642 may determine one or more of the N expected future positions using equation (6) above.

As shown in FIG. 3, the control input is provided to the first and second pressure control modules 306 and 308. The first and second pressure control modules 306 and 308 control the pressures within the chambers the gear actuator 248 based on the control input. Accordingly, the position of the gear actuator 248 is controlled based on the control input.

Controlling the position of the gear actuator 248 using the control input determined herein ensures that the gear actuator 248 will arrive at the desired position as rapidly as possible despite any part-to-part differences and temperature changes. Part-to-part differences in gear actuators may otherwise cause the gear actuator 248 to arrive at the desired position more slowly or not at all. Temperature changes may change the viscosity of the hydraulic fluid applied to the gear actuator 248 and may otherwise cause the gear actuator 248 to arrive at the desired position more slowly or not at all.

Figure 7A:
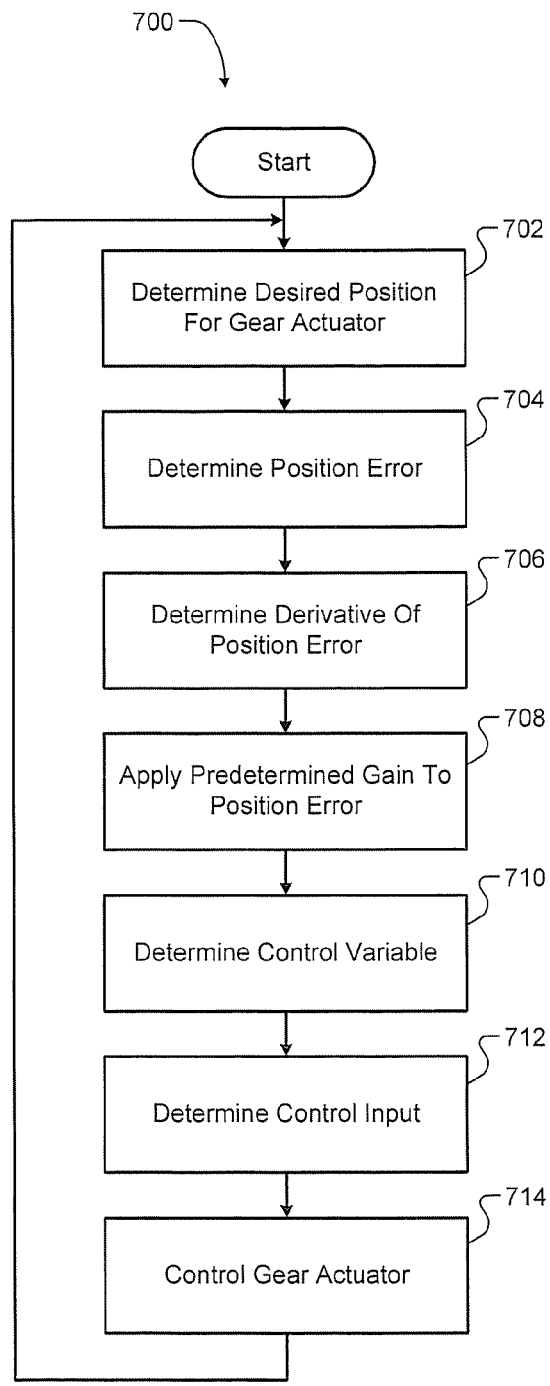

Referring now to FIG. 7, a flowchart depicting exemplary steps performed by a method 700 is presented. The method 700 begins in step 702 where the method 700 determines the desired position for the gear actuator 248. The method 700 may determine the desired position based on the desired gear ratio.

The method 700 determines the position error in step 704. The method 700 determines the position error based on the difference between the gear actuator position measured by the gear actuator position sensor 304 and the desired position. The method 700 determines the derivative of the position error in step 706. The method 700 applies the predetermined gain to the position error in step 708. In other words, the method 700 determines the product of the position error and the predetermined gain in step 708.

In step 710, the method 700 determines the control variable for the gear actuator 248. The method 700 may determine the control variable as the sum of the derivative determined in step 706 and the product determined in step 708. The method 700 determines the control input in step 712. For example only, the method 700 may determine the control input similarly or identically as it is determined by the position control modules 412 of the exemplary embodiments of FIGS. 5A-5D. The method 700 controls the gear actuator 248 based on the control input in step 714, and the method 700 returns to step 702.

Referring now to FIG. 7B, a flowchart depicting exemplary steps performed by another method 730 is presented. For purposes of illustration only, the method 730 may begin in step 732 where the method 730 determines the gear actuator position. For example only, the method may receive the gear actuator position from the gear actuator position sensor 304.

In step 736, the method 730 determines the expected actuator position. For example only, the method 730 may determine the expected actuator position using equation (6) above. The method 730 determines the first error in step 738. The method 730 determines the first error based on the difference between the gear actuator position measured by the gear actuator position sensor 304 and the expected actuator position determined in step 736.

The method 730 determines the desired position for the gear actuator 248 in step 740, and the method 730 determines the control error in step 742. The method 730 determines the control error based on the difference between the desired position and the first error. The method 730 determines the control input based on the control error in step 744. The method 730 controls the gear actuator 248 based on the control input in step 746 and returns to step 736.

Referring now to FIG. 7C, a flowchart depicting exemplary steps performed by another method 760 is presented. The method 760 may begin in step 762 where the method 760 determines the desired position for the gear actuator 248. The method 760 may also determine one or more future desired positions in step 762. The method 760 determines the control input and determines the N future target positions for the N future control loops in step 764.

In step 766, the method 760 controls the gear actuator 248 based on the control input. The method 760 determines the N expected future positions corresponding to the N future control inputs in step 768. The method 760 selectively adjusts one or more of the N future target positions in step 770 and returns to step 762.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a dual clutch transmission (DCT) of a vehicle, comprising:
    a difference module that determines a difference between a desired position for a gear actuator and a measurement of a current position of the gear actuator;
    a summer module that determines a sum of a derivative of the difference and a product of the difference and a predetermined gain; and
    a position control module that controls the current position of the gear actuator based on the sum,
    wherein the current position of the gear actuator controls a position of a gear synchronizer that slides along an output shaft of the DCT, and
    wherein the position of the gear synchronizer controls coupling of a gear ratio with the output shaft.

2. The control system of claim 1 wherein the position control module performs a mathematical function based on the sum, determines a control input based on a second product of a predetermined value and a result of the mathematical function, and controls the current position based on the control input.

3. The control system of claim 2 wherein the position control module determines that the result is equal to one when the sum is greater than zero and that the result is equal to negative one when the sum is less than zero.

4. The control system of claim 2 wherein the position control module performs the mathematical function further based on a second predetermined value,
    wherein the function is one of a hyperbolic tangent function and a saturation function.

5. The control system of claim 4 wherein the position control module performs the mathematical function based on a product of the sum and the second predetermined value.

6. The control system of claim 2 further comprising a proportional-integral-derivative (PID) module that determines a PID value based on the difference,
    wherein the position control module determines the control input further based on the PID value.

7. The control system of claim 6 wherein the position control module determines the control input based on a second sum of the second product and the PID value.

8. The control system of claim 2 further comprising a proportional-derivative (PD) module that determines a PD value based on the difference,
    wherein the position control module determines the control input further based on the PD value.

9. The control system of claim 8 wherein the position control module determines the control input based on a third sum of the second product and the PD value.

10. The control system of claim 2 further comprising first and second pressure control modules that control pressure in first and second chambers of the gear actuator, respectively, based on the control input.

11. A control system for a dual clutch transmission (DCT) of a vehicle, comprising:
    a first difference module that determines a first difference between a measurement of a current position of a gear actuator and an expected position of the gear actuator after actuation based on a control input;
    a second difference module that determines a second difference between a desired position for the gear actuator and the first difference; and
    a position control module that updates the control input based on the second difference and controls the current position based on the control input,
    wherein the current position of the gear actuator controls a position of a gear synchronizer that slides along an output shaft of the DCT, and
    wherein the position of the gear synchronizer controls coupling of a gear ratio with the output shaft.

12. The control system of claim 11 further comprising an expected position module that determines the expected position based on the control input.

13. The control system of claim 12 wherein the expected position module determines the expected position further based on a first predetermined value, a second predetermined value, and a third predetermined value.

14. The control system of claim 13 wherein the position control module updates the control input further based on the first predetermined value, the second predetermined value, the third predetermined value, and a fourth predetermined value.

15. The control system of claim 12 wherein the expected position module determines the expected position using the equation, $$\text{Expected Position} = \frac{K}{s^2 + 2*\xi*\omega_n*s + \omega_n^2} * (\text{Control Input}),$$

where s is the Laplace Transform variable, $\xi$ is a first predetermined value, $\omega_n$ is a second predetermined value, and K is a third predetermined value.

16. The control system of claim 11 wherein the position control module updates the control input using the equation, $$\text{Control Input} = \frac{s^2 + 2*\xi*\omega_n*s + \omega_n^2}{K*(\lambda*s+1)^2} * (\text{Diff2}),$$

where s is the Laplace Transform variable, Diff2 is the second difference, $\xi$ is a first predetermined value, $\omega_n$ is a second predetermined value, K is a third predetermined value, and $\lambda$ is a fourth predetermined value.

17. A control system for a dual clutch transmission (DCT) of a vehicle, comprising:
    a desired position module that determines at least one desired position for a gear actuator;
    a position control module that determines a control input for the gear actuator, that controls a current position of the gear actuator based on the control input, and that determines N future target positions for the gear actuator for N future control loops, respectively, wherein N is an integer greater than one; and an expected position module that determines N expected future positions based on the N future target positions, respectively, wherein the position control module selectively adjusts one or more of the N future target positions based on one or more of the N expected future positions, wherein the position control module controls the current position during an M-th one of the N future control loops based on the M-th one of the N future target positions, and wherein M is an integer and is one of less than and equal to N.

18. The control system of claim 17 wherein the position control module selectively adjusts one or more of the N future target positions based on a measurement of the current position after actuation based on the control input.

* * * * *